Mar. 5, 1929.     C. C. FARMER     1,703,874
COUPLING GASKET
Filed Jan. 4, 1927
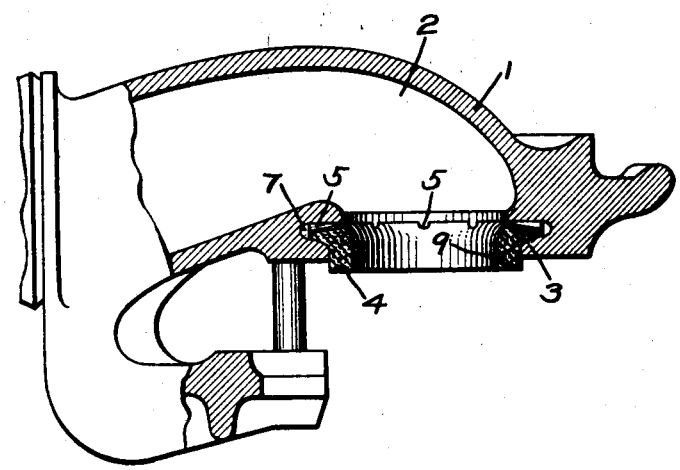
INVENTOR
CLYDE C. FARMER
BY *Wm. M. Cady*
ATTORNEY Patented Mar. 5, 1929.

1,703,874

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

COUPLING GASKET.

Application filed January 4, 1927. Serial No. 158,930.

This invention relates to hose couplings and more particularly to a hand operated hose coupling of the type commonly employed for connecting the fluid pressure brake pipe between railway cars.

The usual hose coupling head is provided with an annular recess adapted to receive the annular flange of a flexible gasket, said gasket being employed to effect a tight seal between two counterpart coupling heads.

Fluid under pressure in the conduit of the hose coupling head, acting on the inner wall of the standard gasket tends to press the flange of said gasket into leak tight engagement with the walls of the recess, but if leakage of fluid under pressure from the conduit to the annular cavity at the rear of the gasket flange should occur, then the fluid pressures on opposite sides of the gasket flange become equalized. When the coupling heads are uncoupled, the fluid pressure at the inner wall of the gasket will be suddenly reduced to atmospheric pressure, and the built up pressure retained in the cavity tends to force the gasket inwardly and may in some cases cause the gasket to be blown out of the coupling head.

The principal object of my invention is to provide an improved hose coupling having means for overcoming the above difficulty.

In the accompanying drawing, the single figure is a fragmentary, sectional view of a hose coupling head, embodying my invention.

As shown in the drawing, the coupling head 1 has the usual air conduit 2 and is provided with an annular recess adjacent to the meeting face of the coupling head, and a gasket 4 is provided having an annular flange 3, which is fitted into said recess.

According to my invention, the flange 3 of the gasket 4 is provided with a plurality of radial grooves 5, adapted to connect the annular cavity 7, at the rear of the gasket flange, with conduit 2.

In operation, when two counterpart hose coupling heads are connected together and conduit 2 is charged with fluid under pressure, the gasket 4 acts in the usual manner to effect a tight seal between the counterpart coupling heads. The fluid under pressure in conduit 2 equalizes through the grooves 5 in the gasket flange into the annular cavity 7 back of the gasket flange.

When the counterpart coupling heads are uncoupled, the pressure of fluid in conduit 2 of the coupling heads is reduced to a low degree, and cavity 7 back of the gasket flange 3 being in constant communication with the conduit 2 by way of the radial groove 5, the pressure of the fluid in said cavity reduces with the pressure of the fluid in conduit 2, so that the opposing pressures acting in cavity 7 on the flange of the gasket and on the interior wall 9 of the gasket remain equal and consequently, there will be no fluid pressure retained in the cavity 7, such as would tend to blow the gasket out of its seat.

Having now described my invention, what I claim as new and desire to secure by Letters Patent, is:—

The combination with a hose coupling having a fluid conduit provided with an opening at the meeting face of the coupling and having an annular recess adjacent to said opening, of a gasket having an annular flange mounted in said recess and provided with a groove connecting said conduit with the recess space at the rear of the gasket flange.

In testimony whereof I have hereunto set my hand.

CLYDE C. FARMER.